Jan. 31, 1956   J. H. LATZEN   2,733,086
SOCKET FOR A BALL AND SOCKET JOINT
Filed March 5, 1952

INVENTOR
JOSEF LATZEN
BY Robert B. Jacob
AGENT

United States Patent Office 2,733,086
Patented Jan. 31, 1956

2,733,086

SOCKET FOR A BALL AND SOCKET JOINT

Josef Hubert Latzen, Oberkassel, Dusseldorf, Germany, assignor to A. Ehrenreich & Cie, Dusseldorf-Oberkassel, Germany, a firm Application March 5, 1952, Serial No. 274,900

2 Claims. (Cl. 287—87)

This invention relates to a socket for a ball and socket joint in which the spherical head of a pin rests directly in a corresponding spherical surface of the socket.

Hitherto sockets of this kind were hardened over their entire inner surface. In this case, however, there is a danger that with relatively thin-walled sockets the hardened zone so greatly reduces the proportion of tough material in the socket that the entire socket wall becomes too brittle, with the consequence that the socket may break or crack under the action of the stresses acting on the joint. Further, the heat required for the hardening, which may be done by an induction hardening, flame hardening or case hardening method, is relatively great, and the hardening process which constitutes the last stage of manufacture, may cause distortion or warping.

According to the invention, hardening of the socket is effected in only two zones, one of which is situated in a plane passing through the centre of the ball at right angles to the axis of the pin, and the other is in the vicinity of the aperture in the socket through which the pin passes. This has the advantage that the material of the socket retains its toughness without any substantial reduction in almost all its cross-sections. This effect can be still further increased by thickening the wall of the socket on the outside around the hardened zone in the centre of the ball by an amount corresponding to the depth to which the hardening penetrates into the material, which result can be obtained by giving the socket a suitable external shape. In the case of thin-walled sockets, therefore, the measures proposed by the invention are of particular value.

The hardened zone can be formed by a wear-resistant ring inserted in a corresponding internal groove in the socket. It is also possible, however, to form one of the hardened zones by a zonal hardening of the inner surface of the socket and the other hardened zone by a wear-resistant ring inserted in a corresponding internal groove. Also both hardened zones may be produced by zonal hardening.

When the hardened zone at the aperture through which the pin enters the socket is produced by zonal hardening it is preferable to harden the inner surface of the opening up to the edge of the outlet opening.

Figure 1:
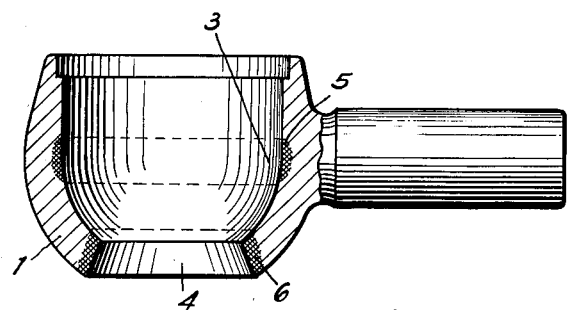
Figure 3:
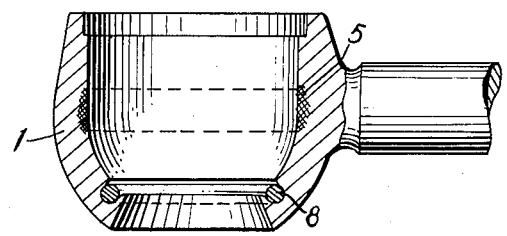
Figure 2:
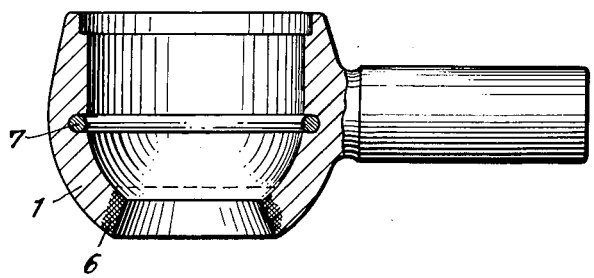

Various forms of sockets for ball and socket joints according to the invention are illustrated, by way of example, in the accompanying drawing, in which;

Figure 1 shows in cross section a socket in which both hardened zones are formed by zonal hardening, Figure 2 shows a cross-section of a socket having the central hardened zone formed by a wear resistant ring and the hardened zone at the opening for the pin by zonal hardening, and Figure 3 shows a cross-section of a socket having the hardened zone at the opening for the pin formed by a wear resistant ring and the central hardened zone by zonal hardening.

Referring to the drawing, the numeral 1 designates the socket of a ball and socket joint. The socket is made of high-grade tough material and has the shape of a more or less spherical pan. The thickness of the wall of the socket is relatively small.

In the interior of the socket are formed two hardened zones 5 and 6, of which the former extends around the socket in the vicinity of the plane 3 through the centre of the ball at right angles to the pin attached to the ball, which is not illustrated, and the other of which is situated at the opening 4 through which the pin passes into the socket.

In example illustrated in Figure 1, the central hardened zone 5 and the hardened zone 6 at the opening for the pin are produced by internal zonal hardening. The hardened zone 6 is situated in the opening in the socket for the passage of the pin and forms an edge zone in the bottom of the socket.

In Figure 2 the central hardened zone is formed by a wear-resistant ring 7 which is inserted in a corresponding internal groove in the socket, whereas the other hardened zone is formed in the same way as in the example according to Figure 1.

Figure 3 shows a central hardened zone 5 which is formed in the same way as in Figure 1. The hardened zone at the opening for the pin is formed by a wear-resistant ring 8 which is inserted in a corresponding internal groove in the socket.

The socket is shaped in such a way that it is thicker in the region of the central hardened zone. Of course, it is possible to provide the wall of the socket with a cross-section of different shape than that illustrated. It is also possible, for example when the lower hardened zone is formed by a wear-resistant ring, to thicken the outer wall of the socket by an amount which compensates for material removed in forming the groove.

I claim:

1. A housing of tough material for a ball and socket joint having an upper portion presenting a smooth interior cylindrical surface area and a lower portion provided with an aperture within the lower housing end and presenting a smooth interior spherical surface area extending downwardly to said aperture and forming with said cylindrical surface area a continuous, smooth inner surface, wherein a hardened surface zone of substantially annular conformation is provided circumferentially of said housing end having said aperture and a similar hardened surface zone is provided on both sides of the junction of said cylindrical surface area and said spherical surface area while the entire material of said housing except for said hardened zones is retained in its tough state.

2. A housing for a ball and socket joint in accordance with claim 1, in which one of said hardened surface zones is defined by a wear resistant ring embedded in a groove formed in the tough material of said housing.

References Cited in the file of this patent

UNITED STATES PATENTS

| 1,218,489 | Stuart | Mar. 6, 1917 |
| 2,200,129 | Whiteford | May 7, 1940 |
| 2,399,847 | Bauersfeld | May 7, 1946 |
| 2,419,691 | Shafer | Apr. 29, 1947 |
| 2,553,337 | Shafer | May 15, 1951 |

FOREIGN PATENTS

| 316,550 | France | of 1902 |
| | (Addition) | |

OTHER REFERENCES

Gourick's Washington Digest (Law Reference Library, Patent Office), par. 21, page 71, volume 21.